United States Patent
Mendel et al.

(10) Patent No.: US 12,511,434 B2
(45) Date of Patent: Dec. 30, 2025

(54) DATA PROCESSING DEVICE AND METHOD FOR PROCESSING SECRET DATA

(71) Applicant: Infineon Technologies AG, Neubiberg (DE)

(72) Inventors: Florian Mendel, Munich (DE); Franz Klug, Aying (DE)

(73) Assignee: Infineon Technologies AG, Neubiberg (DE)

( * ) Notice: Subject to any disclaimer, the term of this patent is extended or adjusted under 35 U.S.C. 154(b) by 117 days.

(21) Appl. No.: 18/530,262

(22) Filed: Dec. 6, 2023

(65) Prior Publication Data

US 2024/0193300 A1    Jun. 13, 2024

(30) Foreign Application Priority Data

Dec. 7, 2022  (DE) ...................... 10 2022 132 529.6

(51) Int. Cl.
*G06F 21/62*  (2013.01)
*H04L 9/08*  (2006.01)

(52) U.S. Cl.
CPC ........ *G06F 21/6245* (2013.01); *H04L 9/0869* (2013.01)

(58) Field of Classification Search
CPC ...... G06F 21/6245; G06F 21/72; G06F 21/75; G06F 21/755; H04L 9/0869; H04L 9/003
See application file for complete search history.

(56) References Cited

U.S. PATENT DOCUMENTS

| | | | | |
|---|---|---|---|---|
| 12,169,570 | B2* | 12/2024 | Schlaeffer | G06F 21/71 |
| 2008/0205637 | A1* | 8/2008 | Kurihara | H04L 9/085 |
| | | | | 380/28 |
| 2022/0237304 | A1 | 7/2022 | Schlaeffer et al. | |
| 2025/0021670 | A1* | 1/2025 | Yang | G06F 21/72 |

FOREIGN PATENT DOCUMENTS

| | | |
|---|---|---|
| DE | 102021101697 B3 | 2/2022 |
| WO | 2022204898 A1 | 10/2022 |

OTHER PUBLICATIONS

Office Action issued for the corresponding German patent application No. 10 2022 132 529.6, dated Nov. 10, 2023, 9 pages.
Dobraunig, Christoph et al., "SIFA: Exploiting Ineffective Fault Inductions on Symmetric Cryptography", IACR Transactions on Cryptographic Hardware and Embedded Systems, published Aug. 16, 2018, pp. 547-572, vol. 2018, Issue 3.

* cited by examiner

*Primary Examiner* — Thaddeus J Plecha
(74) *Attorney, Agent, or Firm* — Viering, Jentschura & Partner mbB

(57) ABSTRACT

According to various embodiments, a data processing device is provided including a memory configured to represent each data word of a plurality of data words in the form of at least two respective shares, a logic circuit, an input circuit configured to provide input shares to the logic circuit depending on a control sequence specifying a sequence of real operations and dummy operations, wherein the logic circuit is configured to process the input shares to generate at least two processing result shares according to a predetermined logic function and an output circuit configured to output the at least two processing result shares if the control sequence specifies the current operation as a real operation and refresh the at least two shares of the one of the data words with the (Continued)

processing result shares if the control sequence specifies the current operation as a dummy operation.

18 Claims, 5 Drawing Sheets

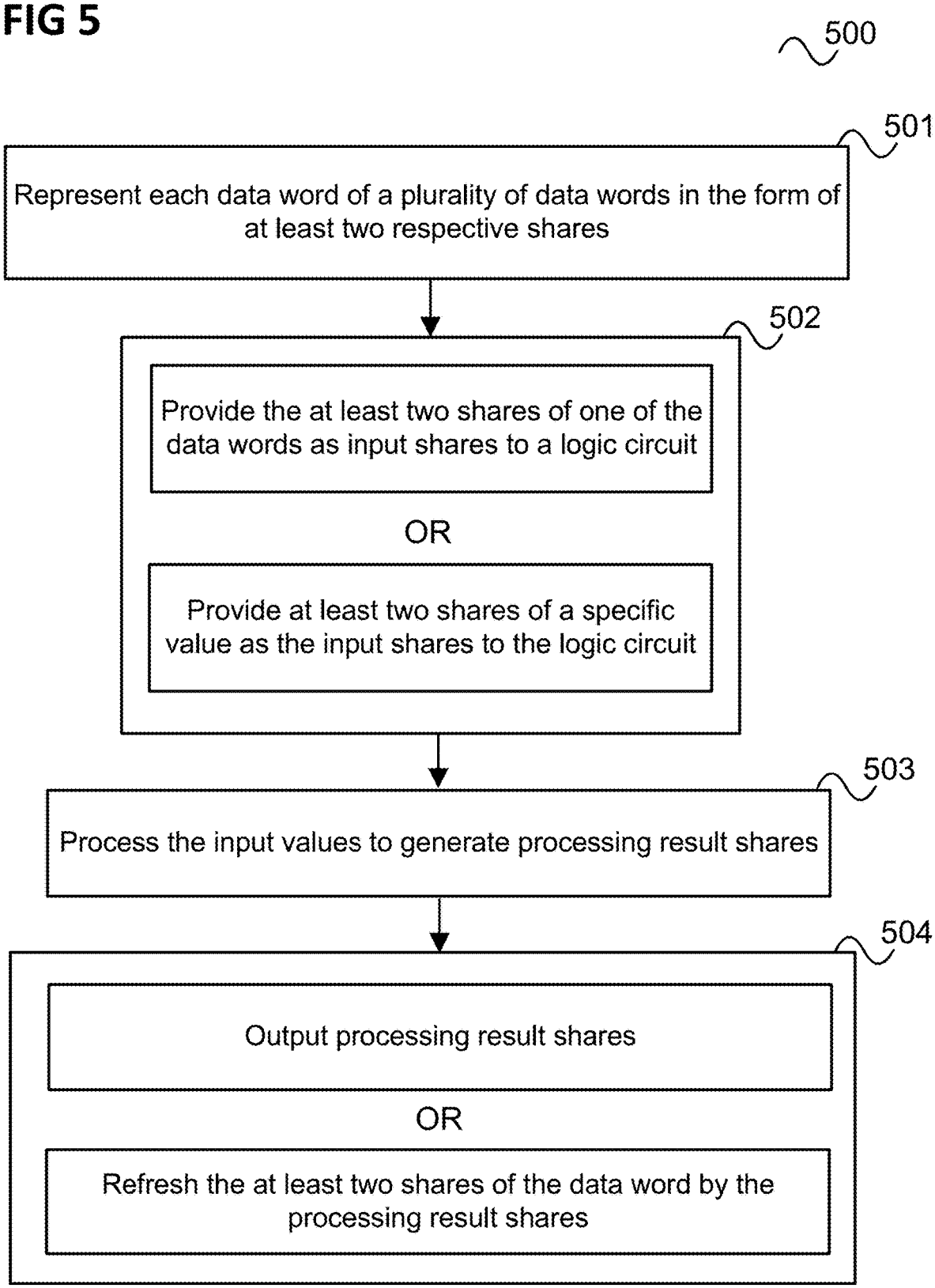

DATA PROCESSING DEVICE AND METHOD FOR PROCESSING SECRET DATA

CROSS-REFERENCE TO RELATED APPLICATIONS

This non-provisional application claims priority to German Application 10 2022 132 529.6, which was filed on Dec. 7, 2022, the entire contents of which are incorporated herein by reference.

TECHNICAL FIELD

The present disclosure relates to data processing devices and methods for processing secret data.

BACKGROUND

Electronic devices which process secure data, such as cryptographic keys, should be protected against physical attacks like fault attacks and side-channel analysis. One approach to counter attacks is the introduction of dummy calculations which are introduced in a processing flow. However, implementing dummy calculations has several challenges like that they need to have the same behavior as real operations (i.e. non-dummy operations), dummy data to be processed in dummy operations needs to be provided and storing dummy operation results introduces additional memory overhead. Therefore, efficient approaches to implement dummy operations in a security context are desirable.

BRIEF SUMMARY

According to various embodiments, a data processing device is provided including a memory configured to represent each data word of a plurality of data words in the form of at least two respective shares, a logic circuit, an input circuit configured to, depending on a control sequence specifying a sequence of real operations and dummy operations,
  provide the at least two shares of one of the data words as input shares to the logic circuit if the control sequence specifies a current operation as a real operation and
  provide at least two shares of a specific value as the input shares to the logic circuit if the control sequence specifies the current operation as a dummy operation,
wherein the logic circuit is configured to receive the input shares from the input circuit and to process the input shares to generate at least two processing result shares according to a predetermined logic function and an output circuit configured to
  output the at least two processing result shares if the control sequence specifies the current operation as a real operation and
  refresh the at least two shares of the one of the data words with the processing result shares and output the refreshed at least two shares of the one of the data words if the control sequence specifies the current operation as a dummy operation.

BRIEF SUMMARY OF THE DRAWINGS

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which:

FIG. 5 shows a flow diagram illustrating a method for processing data according to an embodiment.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The embodiments described herein can be realized by a processing device like a personal computer, microcontroller, smart card (of any form factor), secure microcontroller, hardware root of trust, (embedded) secure element (ESE), Trusted Platform Module (TPM), or Hardware Security Module (HSM).

Figure 1:
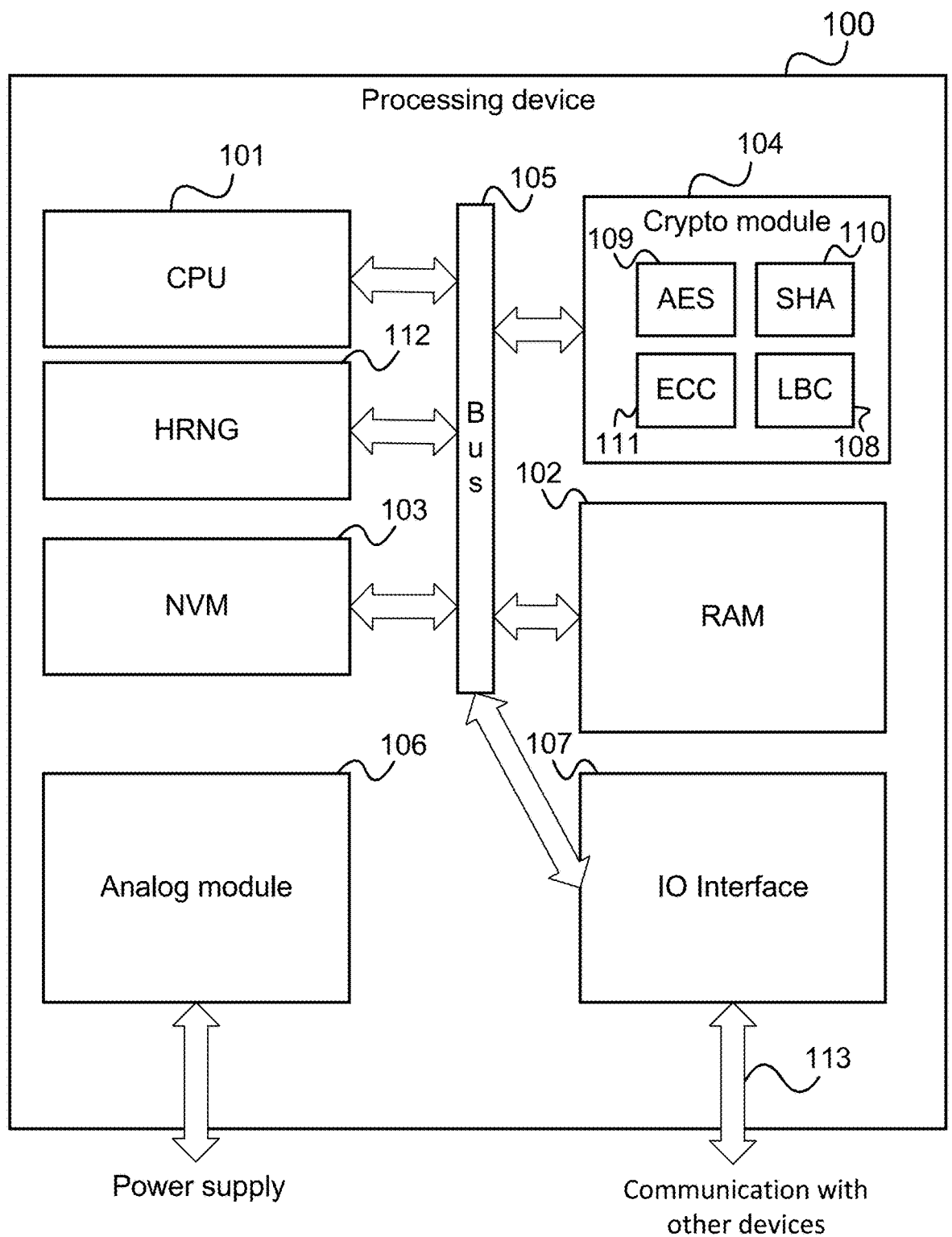
FIG. 1 shows an example for a processing device.

FIG. 1 shows an example for a processing device 100 including a CPU 101, a RAM 102, a non-volatile memory 103 (NVM), a crypto module 104, an analog module 106, an input/output interface 107 and a hardware-random number generator 112.

In this example, the CPU 101 has access to at least one crypto module 104 over a shared bus 105 to which each crypto module 104 is coupled. Each crypto module 104 may in particular include one or more crypto cores to perform certain cryptographic operations. Exemplary crypto cores are:
  an AES core 109,
  a SHA core 110,
  an ECC core 111, and
  a lattice-based crypto (LBC) core 108.

The lattice-based crypto core 108 may be provided in order to accelerate lattice-based cryptography.

The CPU 101, the hardware random number generator 112, the NVM 103, the crypto module 104, the RAM 102 and the input/output interface 107 are connected to the bus 105. The input output interface 107 may have a connection 113 to other devices, which may be similar to the processing device 100.

The analog module 106 is supplied with electrical power via an electrical contact and/or via an electromagnetic field. This power is supplied to drive the circuitry of the processing device 100 and may in particular allow the input/output interface to initiate and/or maintain connections to other devices via the connection 113.

The bus 105 itself may be masked or plain. Instructions for carrying out the processing and algorithms described in the following may in particular be stored in the NVM 103 and processed by the CPU 105. The data processed may be stored in the NVM 103 or in the RAM 102. Supporting functions may be provided by the crypto modules 104 (e.g., expansion of pseudo random data). Random numbers are supplied by the hardware-random number generator 112.

To perform the procedures described in the following, instructions may be stored in the crypto module 104 or they may be provided by the CPU 101 via the bus 105. Data may be stored locally within the crypto module 104. It is also an option that the data is temporarily stored in the RAM 102 or the NVM 103.

The processing and algorithms described in the following may exclusively or at least partially be conducted on the crypto module 104 or on the CPU 101. A processing circuit (such as crypto module 104 or CPU 101) may or may not be equipped with hardware-based security features. Such hardware-based security features could be circuits that implement countermeasures against side-channel power analysis or fault injection (e.g., using a laser), to avoid that an attacker gains information about secret data (such as cryptographic keys or secret user data). Such countermeasures may be realized by the use of randomness, redundant hardware, or redundant processing. In general, the goal of countermeasures is to disguise the internally processed values from an attacker who is able to observe the physical effect the processing of such values.

Typical concepts for protecting the computation of secret data are randomizing the execution order of operations (hiding), performing dummy operations on dummy data (hiding) and masking data to perform randomized computations.

To avoid that an attacker can distinguish dummy operations from real (i.e. non-dummy) operations, they need to have same the behavior as real operations (in terms of what an attacker can monitor). Therefore, for example, it may not be sufficient that dummy results are computed but not used, i.e. in particular not stored, since an attacker may monitor memory accesses. However, providing dummy memory (i.e. memory used for storing dummy operations results) leads to additional chip area overhead. Moreover, an attacker may even be able to identify monitor memory locations where processing results are stored so it may not be sufficient to store dummy results in separate memory locations since an attacker could then again identify dummy operations. Rather, it is desirable to hide the dummy memory in between real memory (i.e. memory used by real operations). Additionally, it is desirable that the processing device detects faults in dummy operations. This is because an attacker may inject faults into an operation and, if an injected fault has no influence on the overall processing, may conclude that the operation is a dummy operation.

The processing described in the following may be performed by a processing circuit like CPU 101 or crypto module 104 (e.g. a crypto core). When reference is made to a memory, this may for example be RAM 102 but also an NVM 103 or processor registers (or a combination of them). The memory may store a program (e.g. for performing a cryptographic method) having instructions to perform cryptographic operations (e.g. computations) and stores data in form of data words to be processed.

According to various embodiments, operations (e.g. all operations) are masked. This means that the one or more data words processed by an operation are each split into shares.

For example, an operation calculating a function F operates on a data word a. The input word a is split into two shares $a_0$ and $a_1$ according to an XOR combination, i.e. $a=a_0\hat{\ }a_1$ (where $\hat{\ }$ denotes XOR). The splitting into shares is not limited to XOR. XOR is only an example for the operation that is used for the splitting into shares (and refreshing of shares) and for example arithmetic (addition) based masking is also possible. Further, the processing circuit implements the operation such that the output word $b=F(a)$ is also masked, i.e. $b=b_0\hat{\ }b_1$. The data words are for example stored in memory in masked form, i.e. the shares are stored (e.g. a is stored as pair of data words $a_0$, $a_1$). In a hardware implementation, the memory may be a flip-flop or a register (i.e. an array of flip-flops). A data word may be remasked. This means that the shares are recomputed (i.e. refreshed). For example, the pair $a_0$, $a_1$ is changed to $a_0'$, $a_1'$ where $a_0\hat{\ }a_1=a_0'\hat{\ }a_1'$. This is referred to as refreshing or remasking operation (or computation) and can be done by XOR-combination of $a_0$ and $a_1$ both with a random value (referred to as mask refresh value) r, i.e. $a_0'=a_0\hat{\ }r$ and $a_1'=a_1\hat{\ }r$.

The processing circuit may use a randomized execution order for the operation (as far as this is possible). Further, according to various embodiments, the processing circuit introduces dummy phases during which it performs dummy operations (D) in between the phases where it performs real operations (R). For example, an operation sequence may be D-D-R-R-D-D. In the following, it is assumed that for each operation of a sequence of operations, a signal "isDummy" indicates whether the operation is a dummy operation or not, i.e. there is a control sequence which specifies, for each operation is a dummy operation or as a real operation.

One possible approach to implement dummy operations in a security context is that the processing circuit performs both a real operation and a refreshing operation (for a data word processed in the real operation) in parallel (e.g. at least partially during the same one or more processor clock cycles). The refreshing operation serves as dummy operation and a multiplexer selects between the refreshing and the real operation i.e. selects which processing result is output (and stored in memory). For example, $(b_0[i]\hat{\ }b_1[i])=\text{MUX}((a_0[i]\hat{\ }r, a_1[i]\hat{\ }r), F(a_0[i]\hat{\ }r, a_1[i]\hat{\ }r))$ Here, i may be a random positive integer to randomize the execution order. An example is described in more detail in the following.

Figure 2:
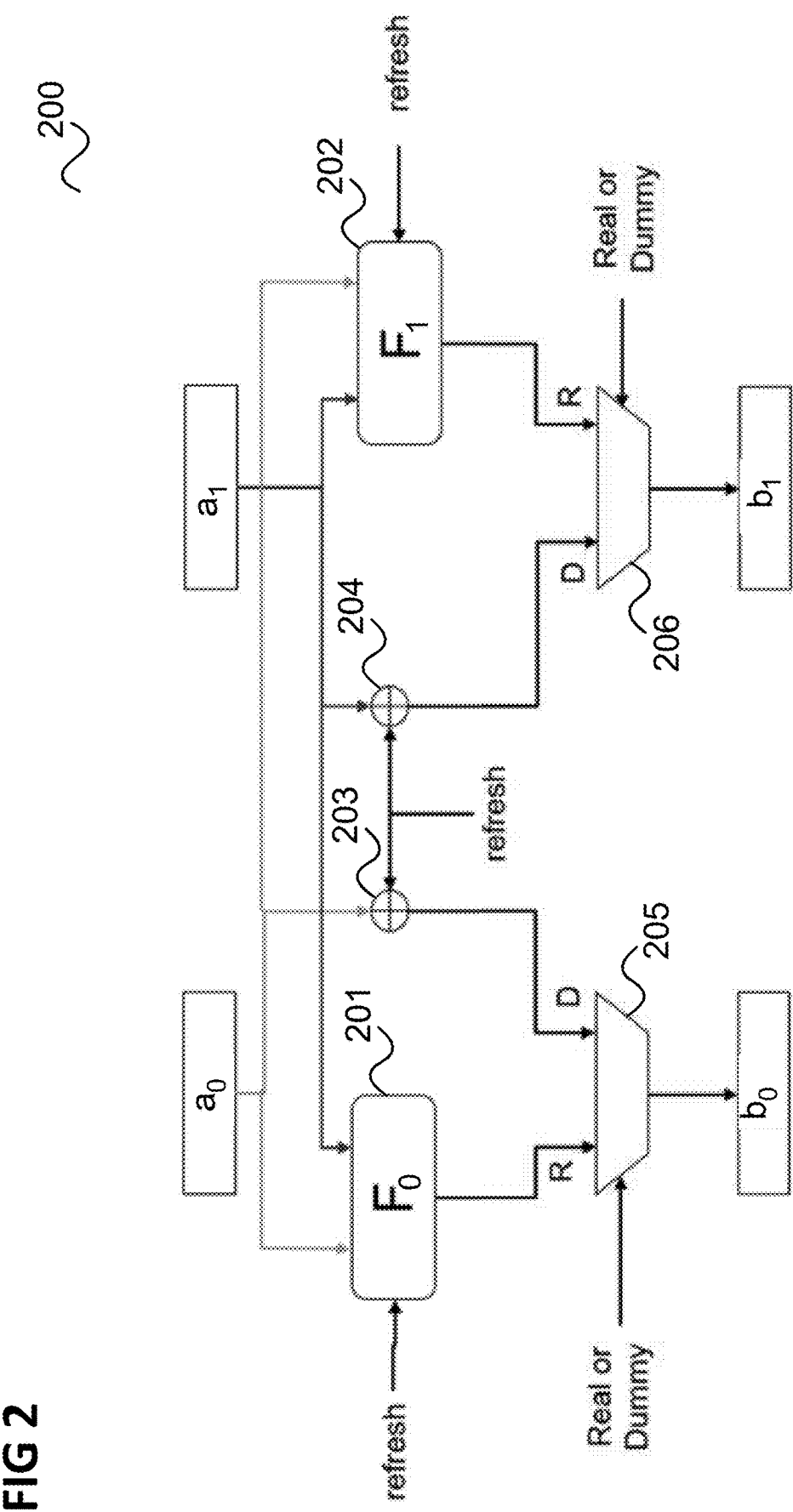
FIG. 2 shows a processing circuit.

FIG. 2 shows a processing circuit 200 according to an embodiment. The processing circuit 200 includes several (in this example two) parallel processing blocks (e.g. circuitry) 201, 202 for calculation of the output value of a function F of an input value.

As above, the input word is denoted as a, (randomly) split into shares $a_0$, $a_1$ and the output word is denoted as b, (randomly) split into shares $b_0$ and $b_1$.

The processing blocks 201, 202 calculate $F_0(a_0, a_1)$ and $F_1(a_0, a_1)$, respectively.

The processing circuit 200 further includes mask refresh circuits 203, 204. The mask refresh circuits 203, 204 receive a mask refresh value r and compute $a_0'=a_0\hat{\ }r$ and $a_1'=a_1\hat{\ }r$, respectively.

A first multiplexer 205 receives the outputs of the first processing block 201 and the first mask refresh circuit 203. It receives a control value which indicates whether a real operation should be carried out (i.e. $F_0(a_0, a_1)$ should be output) or a dummy operation should be carried out (i.e. $a_0'$ should be output). Accordingly, the first multiplexer 205 outputs $b_0=F_0(a_0, a_1)$ or $b_0=a_0'$ depending on the control value.

Similarly, a second multiplexer 206 receives the outputs of the second processing block 202 and the second mask refresh circuit 204. It receives the control value which indicates whether a real operation should be carried out (i.e. $F_1(a_0, a_1)$ should be output) or a dummy operation should be carried out (i.e. $a_1'$ should be output). Accordingly, the second multiplexer 206 outputs $b_1=F_1(a_0, a_1)$ or $b_1=a_1'$ depending on the control value.

The control value may be a control value of a (random) sequence of control values (i.e. a control sequence). The control sequence thus specifies a sequence of real operations and dummy operations. Together with the value i the control sequence thus specifies an operation sequence. A resulting operation sequence may for example be D[2]-D[3]-D[0]-R[3]-R[0]-R[1]-R[2]-D[1].

The processing circuit 200 stores the output shares $b_0$, $b_1$ in memory.

For a real operation $b=b_0\char`\^b_1=F_0(a_0, a_1)\char`\^F_1(a_0, a_1)$.

For a dummy operation $b=a_0'\char`\^a_1'$.

The output shares $b_0$, $b_1$ may for example be stored in the location of the input shares $a_0$, $a_1$. Thus, in case of a dummy operation, the processing may continue in the usual fashion since the dummy operation has only performed a remasking.

The approach of FIG. 2 allows protection by means of dummy operations with little area overhead (because there is no need to store extra dummy data) and without the need to include dummy memory hidden in between real memory. Moreover, since the results of dummy operation are written back to memory, a dummy operation is indistinguishable from a real operation.

However, in the approach of FIG. 2, faults in the calculation of F cannot be detected in case of a dummy operation. This enables safe-error or SIFA (statistical ineffective fault attacks) attacks. Further, in the approach of FIG. 2, real (i.e. non-dummy) data is processed by F for each operation (irrespective whether it is a dummy operation or a real operation). This reduces the effectiveness of hiding countermeasures against side channel attacks. Additionally, a randomized execution order needs to be used.

In view of the above, according to various embodiments, a processing circuit is provided which a dummy operation operates on a specific value (e.g. a special random shared constant) $c=c_0\char`\^c_1$ such that $F_0(c_0, c_1)\char`\^F_1(c_0, c_1)=d_0\char`\^d_1=0$ and uses the results $d_0$ and $d_1$ for remasking the real data. This is explained in the following with reference to the example of FIG. 3.

Figure 3:
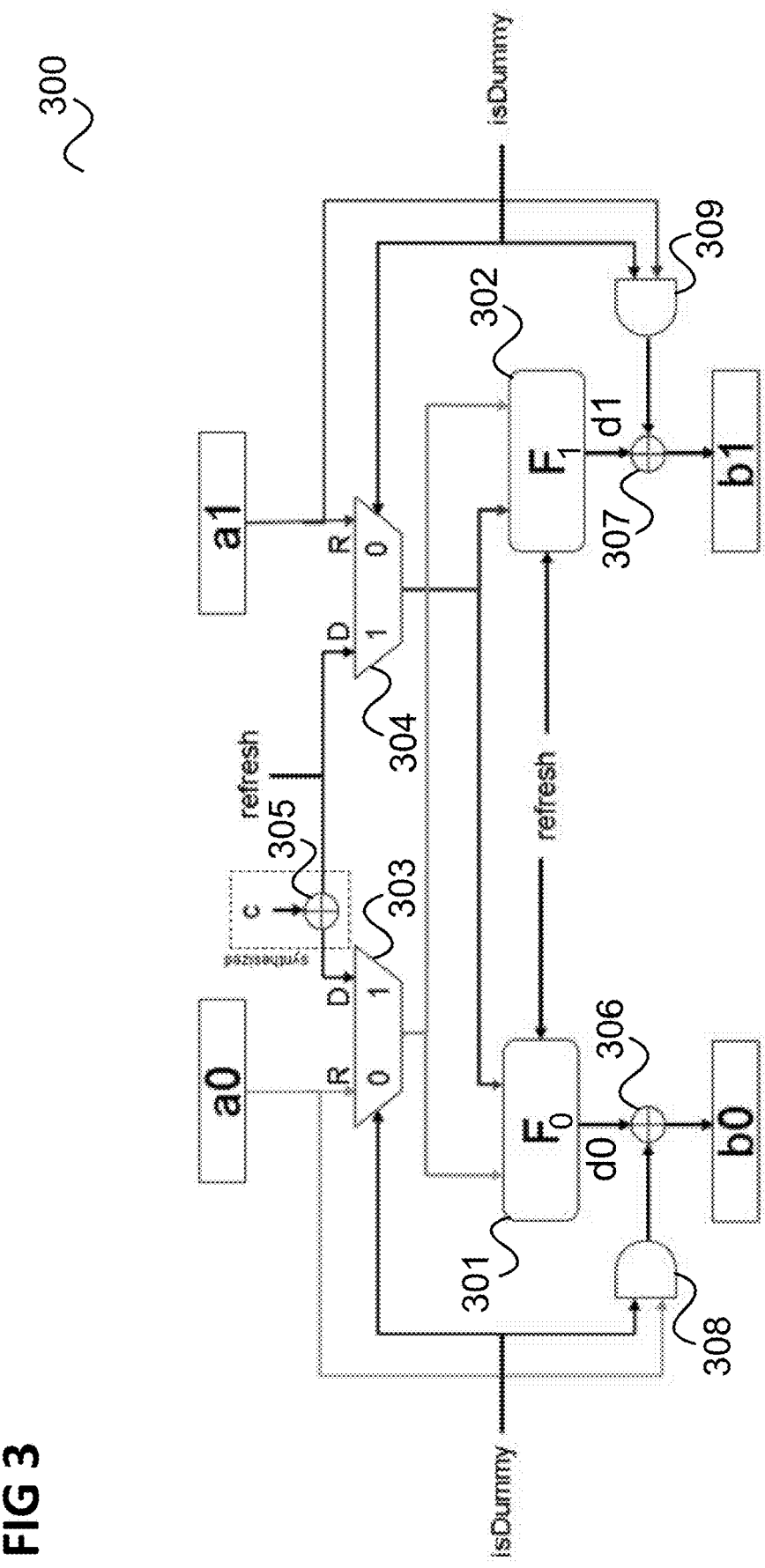
FIG. 3 shows a processing circuit according to an embodiment

FIG. 3 shows a processing circuit 300 according to an embodiment.

As in FIG. 2, the processing circuit 300 includes several (in this example two) parallel processing blocks (e.g. circuitry): a first processing block 301 and a second processing block 302 for calculation of the output value of a function $F=F_0\char`\^F_1$ of an input value. The first processing block 301 and a second processing block 302 may take a mask refresh value into account in their calculation.

For a real operation (i.e. an operation that the control sequence, i.e. the signal isDummy, does not specify as dummy operation), a respective multiplexer 303, 304 (which receives the signal isDummy) selects a respective share $a_0$, $a_1$ as the input value (i.e. input share) of the respective processing block 301, 302. As above, the input word a is (randomly) split into the shares $a_0$, $a_1$.

As explained with reference to FIG. 2, the control value isDummy is a control value of a (random) sequence of control values (i.e. a control sequence) and the execution order may be randomized.

For a dummy operation, however, i.e. if the signal isDummy specifies the current operation as dummy operation, the respective multiplexer selects a respective share $c_0$, $c_1$ of a specific value c as the input value (i.e. input share) of the respective processing block 301, 302. The splitting of the specific value c may be refreshed (for each operation or after a certain, possibly random, number of operations). For example, as depicted in FIG. 3 with a first mask refresh circuit 305, the splitting may be calculated as $c_0=c\char`\^refresh$ $c_1=refresh$ This means that as in the above example, splitting (and refreshing) is done according to a (bit-wise) XOR but the splitting into shares is not limited to XOR. XOR is only an example and for example arithmetic (addition) based masking is also possible The output word of the processing circuit 300 is, as above, denoted as b, (randomly) split into shares $b_0$ and $b_1$.

Each processing block 301, 302 calculate $F_0$ and $F_1$, respectively, applied to the input shares. The outputs of the processing blocks 301, 302 are denoted as processing result shares $d_0$ and $d_1$, respectively.

This means that for a real operation
  the first processing block 301 calculates $d_0=F_0(a_0, a_1)$
  and
  the second processing block 302 calculates $d_1=F_1(a_0, a_1)$
for a dummy operation
  the first processing block 301 calculates $d_0=F_0(c_0, c_1)$
  and
  the second processing block 302 calculates $d_1=F_1(c_0, c_1)$.

The processing circuit 300 further includes a second mask refresh circuit 306 and a third mask refresh circuit 307.

The first mask refresh circuit 306 receives the output of a first AND gate 308 and the third mask refresh circuit 307 receives the output of a second AND gate 309. Further, the second mask refresh circuit 306 receives the output of the first processing block 301 and the third mask refresh circuit 307 receives the output of the second processing block 302.

The second mask refresh circuit 306 and the third mask refresh circuit 307 each perform an XOR operation of its inputs. As explained above, it should be noted that other masking operations may be used, e.g. arithmetic (addition) based masking. Further, it should be noted that while in the example of FIG. 3 the second mask refresh circuit 306 and the third mask refresh circuit 307 operate on bit values, the processing circuit 300 may also be designed to operate on broader values (e.g. process 4-bit values). Accordingly, the AND gates 308, 309 would then be configured to perform an AND operation of values of that have more than one bit.

The first AND gate 308 and the second AND gate 309 each receive the isDummy signal. In the one-bit case this is a single bit (either 0 or 1) but in case of values of more than one bit it may also switch between to values that comprise multiple bits (e.g. between 0000 or 1111).

The first AND gate 308 receives $a_0$ as its second input and the second AND gate 309 receives $a_1$ as its second input.

This means that
for a real operation
  the first AND gate 308 outputs 0
  the second AND gate 309 outputs 0
for a dummy operation
  the first AND gate 308 outputs $a_0$
  the second AND gate 309 outputs $a_1$
Accordingly,
for a real operation
  the second mask refresh circuit 306 outputs $b_0=F_0(a_0, a_1)$
  the second AND gate 309 outputs $b_1=F_1(a_0, a_1)$
for a dummy operation
  the second mask refresh circuit 306 outputs $b_0=a_0\char`\^F_0(c_0, c_1)$
  the third mask refresh circuit 306 outputs $b_1=a_1\char`\^F_1(c_0, c_1)$ So, similarly to the processing circuit 200 of FIG. 2, the processing circuit 300 of FIG. 3 correctly determines the results $F_0(a_0, a_1)$ and $F_1(a_0, a_1)$ for real operations and performs a remasking of the input a for dummy operations.

The first mask refresh circuit 305 generates different splittings of c. According to various embodiments, for all of this splittings (into $c_0$ and $c_1$ in the above example), the combination, according to the operation used by the second mask refresh 306 circuit and the third mask refresh circuit 307 (i.e. XOR in the above example), of the results of the processing of the at least two shares by the logic circuit gives the same value of for all this splittings (i.e. $F_0(c_0, c_1)\char`\^ F_1(c_0, c_1)$=const. in the above example, e.g. $F_0(c_0, c_1)\char`\^ F_1(c_0, c_1)$=0, for all splittings). Thus, it can be ensured that the different splittings of c that are used do not have different impacts on the data word and thus can all be used for remasking. Depending on the value of the combination of the shares of the splittings, e.g. depending on the value of $F_0(c_0, c_1)\char`\^ F_1(c_0, c_1)$ the circuit may be adapted to ensure that the data word is not altered but only remasked (i.e. to compensate the value of the shares of the splittings of c when remasking). For example, if $F_0(c_0, c_1)\char`\^ F_1(c_0, c_1)$=1, one of the second mask refresh circuit 306 and the third mask refresh circuit 307 may include an inverter following the XOR, or the XOR may be replaced by an XNOR.

Figure 4:
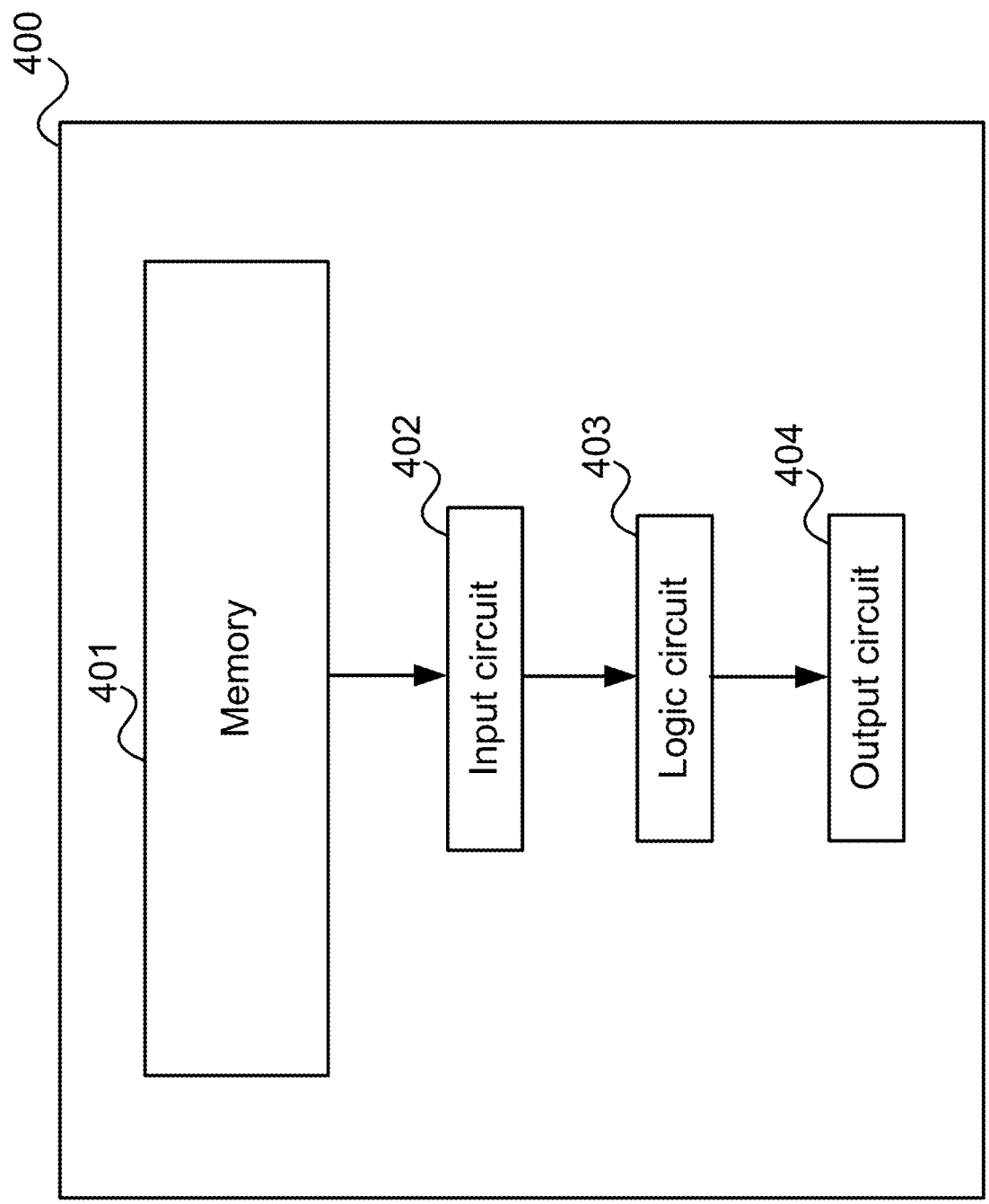
FIG. 4 shows a data processing device according to an embodiment.

In summary, according to various embodiments, a data processing device is provided as illustrated in FIG. 4.

FIG. 4 shows a data processing device 400 according to an embodiment.

The data processing device 400 comprises a memory 401 configured to represent (and store) each data word of a plurality of data words in the form of at least two respective shares and a logic circuit 403 (in the example of FIG. 3 corresponding to the processing blocks 301, 302).

The data processing device 400 further comprises an input circuit 402 configured to, depending on a control sequence specifying a sequence of real operations and dummy operations,
  provide the at least two shares of one of the data words as input shares to the logic circuit if the control sequence specifies a current operation as a real operation and
  provide at least two shares of a specific (or predetermined or predefined) value as the input shares to the logic circuit if the control sequence specifies the current operation as a dummy operation.

The logic circuit 403 is configured to receive the input shares from the input circuit and to process the input shares to generate at least two processing result shares according to a predetermined logic function.

The data processing device 400 further comprises an output circuit 404 configured to
  output (and e.g. store, for example in the memory) the at least two processing result shares (as output shares) if the control sequence specifies the current operation as a real operation and
  refresh the at least two shares of the one of the data words with the processing result shares if the control sequence specifies the current operation as a dummy operation and output (and e.g. store, for example in the memory) the refreshed at least two shares of the one of the data words (as output shares).

According to various embodiments, in other words both dummy and real computation is performed using the same logic function (F in the above examples) such that the power profiles of real and dummy operations are similar Dummy operations are performed on a specific value such as a random shared constant, e.g. providing by a (pseudo) random number generator (e.g. corresponding to the random number generator 112). Thus, no extra dummy data is necessary. The result of the processing by the logic circuit in a dummy operation is used for remasking of real data (i.e. refreshing of the shares of the real data) and the result of the remasking is for example written back to memory or a register. Thus, a fault in a dummy operation affects the real data.

As the processing circuit 200 of FIG. 2, the approach of FIG. 4 (e.g. in the form of the processing circuit of FIG. 3) allows protection by means of dummy operations with little area overhead (because there is no need to store extra dummy data) and without the need to include dummy memory hidden in between real memory (so no constraints on the location of dummy and real data). Moreover, since the results of dummy operation are written back to memory, a dummy operation is indistinguishable from a real operation.

In addition (and in contrast to the processing circuit 200 of FIG. 2), a fault in a logic circuit affects real data even when it occurs in a dummy operation in the approach of FIG. 4. This increases robustness against safe-error and SIF^attacks. Additionally (and in contrast to the processing circuit 200 of FIG.), real data is not processed by the logic circuit in dummy operations. This increases robustness against side channel attacks).

The specific value (corresponding to c in the example of FIG. 3) may be chosen dynamically during execution of the sequence of operations (e.g. for a certain sub-sequence) or fixed beforehand (predetermined) which might be more efficient.

FIG. 5 shows a flow diagram 500 illustrating a method for processing (at least partially secret) data.

In 501, each data word of a plurality of data words is represented in the form of at least two respective shares.

In 502, depending on a control sequence specifying a sequence of real operations and dummy operations,
  the at least two shares of one of the data words are provided as input shares to a logic circuit if the control sequence specifies a current operation as a real operation and
  at least two shares of a specific value are provided as the input shares to the logic circuit if the control sequence specifies the current operation as a dummy operation.

In 503, the input shares are processed by the logic circuit to generate at least two processing result shares according to a predetermined logic function.

In 504,
  the at least two processing result shares are output if the control sequence specifies the current operation as a real operation and
  the at least two shares of the one of the data words are refreshed with the processing result shares and the refreshed at least two shares of the one of the data words are output if the control sequence specifies the current operation as a dummy operation.

Various Examples are described in the following:

Example 1 is a data processing device as described above with reference to FIG. 4.

Example 2 is the data processing device of example 1, wherein the specific value is predetermined and pre-stored in the data processing device.

Example 3 is the data processing device of example 1 or 2, wherein the specific value is fixed in the data processing device.

Example 4 is the data processing device of example 1, wherein the specific value is different from dummy operation to dummy operation for at least some of the dummy operations in the sequence of real operations and dummy operations.

Example 5 is the data processing device of any one of examples 1 to 4, wherein the input circuit is configured to provide, for each dummy operation of the sequence of real operations and dummy operations, the at least two shares of the specific value to the logic circuit according to a respective splitting of the specific value into the at least two shares.

Example 6 is the data processing device of example 5, wherein the splitting of the specific value into the at least two shares is different from dummy operation to dummy operation for at least some dummy operations in the sequence of real operations and dummy operations.

Example 7 is the data processing device of example 5 or 6, wherein, for all dummy operations of the sequence of real operations and dummy operations, the splitting of the specific value into the at least two shares is from a set of splittings of the specific value and wherein the set of splittings of the specific value is such that the combination of the results of the processing of the at least two shares of the splitting by the logic circuit, according to the refreshing operation used for refreshing the at least two shares of the one of the data words, gives the same value for all splittings of the set of splittings.

Example 8 is the data processing device of example 7, wherein the output circuit is configured to, in the refreshing of the at least two shares of the data word, compensate the result of the combination, according to the refreshing operation used for refreshing the at least two shares of the one of the data words, of the results of the processing of the at least two shares of the splitting by the logic circuit.

Example 9 is the data processing device of any one of examples 1 to 8, wherein refreshing the at least two shares of the one of the data words comprises an exclusive-or combination or an arithmetic adding.

Example 10 is the data processing device of any one of examples 1 to 9, wherein the sequence of the operations for which the control sequence specifies that a real operation is to be carried out implements a cryptographic processing of data represented by the plurality of data words.

Example 11 is the data processing device of example 10, wherein the cryptographic processing is a decryption, an encryption, a signing or a key generation.

Example 12 is the data processing device of any one of examples 1 to 11, comprising a random number generator and a control sequence generation circuit configured to generate the control sequence based on one or more random numbers provided by the random number generator.

Example 13 is the data processing device of any one of examples 1 to 12, wherein the logic circuit is configured to receive a mask refresh value and is configured to perform the processing of the at least two shares of the one of the data words using the mask refresh value.

Example 14 is the data processing device of any one of examples 1 to 13, wherein the logic circuit is configured to process the at least two shares of the one or the data words according to a non-dummy operation to generate the at least two shares of the result data word.

Example 15 is the data processing device of any one of examples 1 to 14, wherein the logic circuit is configured to process the at least two shares to generate the at least two processing result shares according to an operation going beyond or differing from a remasking.

Example 16 is the data processing device of any one of examples 1 to 15, wherein the data words comprise secret data.

Example 17 is the data processing device of any one of examples 1 to 16, wherein the data words comprise one or more cryptographic keys.

Example 18 is a method for processing data as described above with reference to FIG. 5.

According to a further example, a processing device is provided including representing means for representing each data word of a plurality of data words in the form of at least two respective shares, input means for, depending on a control sequence specifying a sequence of real operations and dummy operations,
  providing the at least two shares of one of the data words as input shares to a logic circuit if the control sequence specifies a current operation as a real operation and
  providing at least two shares of a specific value as the input shares to the logic circuit if the control sequence specifies the current operation as a dummy operation
processing means for processing the input shares by the logic circuit to generate at least two processing result shares according to a predetermined logic function; and outputting means for
  outputting the at least two processing result shares if the control sequence specifies the current operation as a real operation and
  refreshing (i.e. updating) the at least two shares of the one of the data words (i.e. remasking the one of the data words) with the processing result shares and outputting the refreshed at least two shares of the one of the data words if the control sequence specifies the current operation as a dummy operation.

In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which are described herein may also be understood as a "circuit" in accordance with an alternative embodiment.

In particular, according to various embodiments, a "circuit" may be hard-wired circuit with a fixed functionality (i.e. configured to calculate a fixed Boolean function). For example, mask refresh circuits of the output circuit performing the refreshing may be implemented by an array of XOR gates.

The logic circuit for example implements an S-Box.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS

100 processing device
101 CPU
102 RAM

103 NVM
104 crypto module
105 bus
106 analog module
107 IO interface
108-111 crypto cores
112 random number generator
113 communication connection
200 processing circuit
201, 202 processing blocks
203, 204 mask refresh circuits
205, 206 multiplexers
300 processing circuit
301, 302 processing blocks
303, 304 multiplexers
305-307 mask refresh circuits
308, 309 AND gates
400 data processing device
401 memory
402 input circuit
403 logic circuit
404 output circuit
500 flow diagram
501-504 processing

What is claimed is:

1. A data processing device comprising:
a memory configured to represent each data word of a plurality of data words in the form of at least two respective shares;
a logic circuit;
an input circuit configured to, depending on a control sequence specifying a sequence of real operations and dummy operations,
provide the at least two shares of one of the data words as input shares to the logic circuit if the control sequence specifies a current operation as a real operation and
provide at least two shares of a specific value as the input shares to the logic circuit if the control sequence specifies the current operation as a dummy operation;
wherein the logic circuit is configured to receive the input shares from the input circuit and to process the input shares to generate at least two processing result shares according to a predetermined logic function; and
an output circuit configured to
output the at least two processing result shares if the control sequence specifies the current operation as a real operation and
refresh the at least two shares of the one of the data words with the processing result shares and output the refreshed at least two shares of the one of the data words if the control sequence specifies the current operation as a dummy operation.

2. The data processing device of claim 1, wherein the specific value is predetermined and pre-stored in the data processing device.

3. The data processing device of claim 1, wherein the specific value is fixed in the data processing device.

4. The data processing device of claim 1, wherein the specific value is different from dummy operation to dummy operation for at least some of the dummy operations in the sequence of real operations and dummy operations.

5. The data processing device of claim 1, wherein the input circuit is configured to provide, for each dummy operation of the sequence of real operations and dummy operations, the at least two shares of the specific value to the logic circuit according to a respective splitting of the specific value into the at least two shares.

6. The data processing device of claim 5, wherein the splitting of the specific value into the at least two shares is different from dummy operation to dummy operation for at least some dummy operations in the sequence of real operations and dummy operations.

7. The data processing device of claim 5, wherein, for all dummy operations of the sequence of real operations and dummy operations, the splitting of the specific value into the at least two shares is from a set of splittings of the specific value and wherein the set of splittings of the specific value is such that a combination of the results of the processing of the at least two shares of the splitting by the logic circuit, according to the refreshing operation used for refreshing the at least two shares of the one of the data words, gives the same value for all splittings of the set of splittings.

8. The data processing device of claim 7, wherein the output circuit is configured to, in the refreshing of the at least two shares of the data word, compensate the result of the combination, according to the refreshing operation used for refreshing the at least two shares of the one of the data words, of the results of the processing of the at least two shares of the splitting by the logic circuit.

9. The data processing device of claim 1, wherein refreshing the at least two shares of the one of the data words comprises an exclusive-or combination or an arithmetic adding.

10. The data processing device of claim 1, wherein the sequence of the operations for which the control sequence specifies that a real operation is to be carried out implements a cryptographic processing of data represented by the plurality of data words.

11. The data processing device of claim 10, wherein the cryptographic processing is a decryption, an encryption, a signing or a key generation.

12. The data processing device of claim 1, comprising a random number generator and a control sequence generation circuit configured to generate the control sequence based on one or more random numbers provided by the random number generator.

13. The data processing device of claim 1, wherein the logic circuit is configured to receive a mask refresh value and is configured to perform the processing of the at least two shares of the one of the data words using the mask refresh value.

14. The data processing device of claim 1, wherein the logic circuit is configured to process the at least two shares of the one or the data words according to a non-dummy operation to generate the at least two shares of a resulting data word.

15. The data processing device of claim 1, wherein the logic circuit is configured to process the at least two shares to generate the at least two processing result shares according to an operation going beyond or differing from a remasking.

16. The data processing device of claim 1, wherein the data words comprise secret data.

17. The data processing device of claim 1, wherein the data words comprise one or more cryptographic keys.

18. A method for processing data comprising:
representing each data word of a plurality of data words in the form of at least two respective shares;
depending on a control sequence specifying a sequence of real operations and dummy operations, providing the at least two shares of one of the data words as input shares to a logic circuit if the control sequence specifies a current operation as a real operation and providing at least two shares of a specific value as the input shares to the logic circuit if the control sequence specifies the current operation as a dummy operation;

processing the input shares by the logic circuit to generate at least two processing result shares according to a predetermined logic function; and outputting the at least two processing result shares if the control sequence specifies the current operation as a real operation and refreshing the at least two shares of the one of the data words with the processing result shares and outputting the refreshed at least two shares of the one of the data words if the control sequence specifies the current operation as a dummy operation.

* * * * *